Feb. 21, 1928.
W. S. BREMER
ELECTRIC PERCOLATOR
Filed June 4, 1926
1,659,561
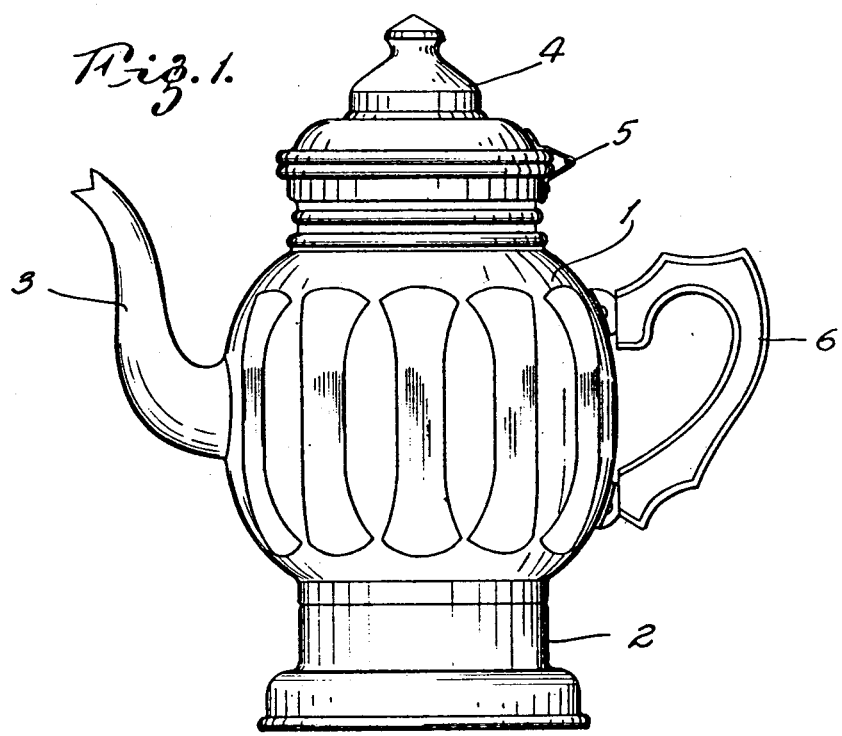
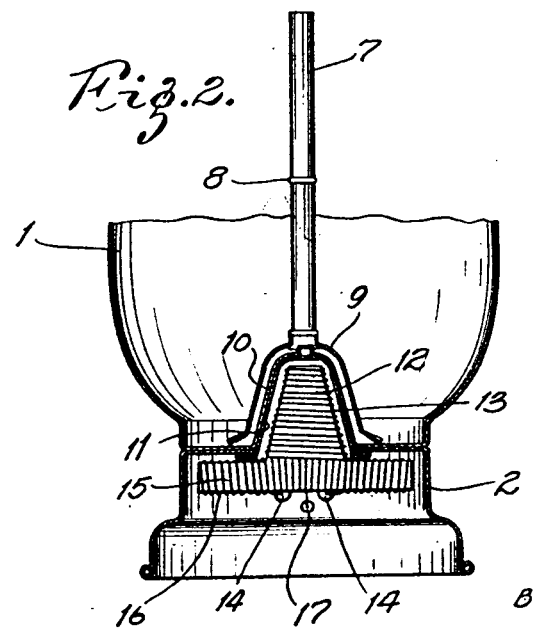
INVENTOR:
WILLIAM S. BREMER
BY W. L. Dempsey
ATTORNEY Patented Feb. 21, 1928.

1,659,561

UNITED STATES PATENT OFFICE.

WILLIAM S. BREMER, OF ST. LOUIS, MISSOURI, ASSIGNOR TO ST. LOUIS ALUMINUM COMPANY, A CORPORATION OF MISSOURI.

ELECTRIC PERCOLATOR.

Application filed June 4, 1926. Serial No. 113,700.

My invention relates to percolators for making coffee, and particularly to that class of percolators known as "electric percolators".

The primary object of my invention is to provide a percolator of greater efficiency than has heretofore been produced, by increasing the superficial area through which the heat generated by the electric heating element is transmitted, without increasing the diameter and superficial area of the bottom of the percolator.

A further object of my invention is to provide a suitable ornamental base, which is readily attachable and detachable from the body of the percolator either when in use or nonuse.

Other and further objects and advantages of my invention will be apparent from the specification, claims and drawings, in which:

Fig. 1 is a perspective view of a complete percolator.

Fig. 2 is a vertical cross-section through the base and lower part of a percolator.

The conventional electric percolator consists of a main body portion designated as 1, a base, designated as 2, a spout 3, a lid or cover 4, suitably hinged at 5, and a handle 6.

Internally percolators are provided with a vertically disposed hollow tube 7, open at both ends and provided intermediate of its ends with a collar, or externally protruding rib 8, which serves the purpose of supporting a cup, through the geometrical center of which the tube 7 protrudes. The cup is made to substantially fit the interior of the percolator, so that steam or hot water forced up through the tube 7 drains back through the coffee held in the cup, the bottom and sides of the cup being perforated.

To the extent above-outlined the conventional percolator corresponds with my improved percolator. In the conventional percolator the heating element is disposed in the base of the percolator, which is integral with the body thereof, hence when the percolator is being used to pour out coffee, either the wire conductors must be lifted with the percolator, which is often troublesome and inconvenient, or they must be entirely detached therefrom. Another disadvantage of the conventional percolator is that if it is desired to make an artistic vessel such as is shown in Fig. 1, the heating surface would be greatly reduced. Therefore, in order to provide a heating surface of greater magnitude, i. e. that will heat a given quantity of water to a given temperature in the shortest space of time, I have provided a structure as shown in Fig. 2, which in its general outline simulates the frustum of a cone.

Attached to the base of the hollow tube 7 is a deeply concaved disc 9, the concavity of which substantially agrees with the cone-shaped depression 10 in the central portion of the bottom of the body of the percolator, so that when viewed from the interior of the percolator the upwardly disposed concavity is substantially a frustum of a hollow cone, whose sides are substantially parallel with the side walls of the disc 9 and spaced apart therefrom.

The base 2 of the percolator is circular in form. Around the marginal edge of the top of the base is a plane, flat surface, while the central portion 11 protrudes upwardly forming a frustum of a hollow cone, the outer walls of which coincide throughout and contact with the outer walls of the similar hollow frustum constituting a part of the bottom of the percolator.

The heating element consists of a conical core 12 of great dielectric strength, about which is wound a plurality of turns of electrical conductors 13 having suitable terminals designated as 14, by means of which contact is made with any convenient source of electric current.

The heating element thus described is an independent unit and serves the purpose of heating the water and causing it to flow upwardly through the tube 7 and drain through the coffee into the body of the percolator.

Around the base of the conical core 12 an additional core 15, in the form of an annular ring is horizontally disposed adjacent the top of the base, about which is wound a plurality of turns of electrical conductor wire 16, having a suitable terminal designated at 17.

The purpose of this element is twofold. First, it acts jointly with the conical heating element to raise the temperature of the water at the beginning of the operation; and, second, when the coffee has reached sufficient strength by means of the percolating element, the percolating element is cut off and the horizontally disposed element continues to function for the purpose of keeping the coffee warm without increasing its strength.

It has been experimentally determined that a given quantity of water can be raised to a given temperature by my device in less than one-half the time it can be accomplished in the conventional electric percolator.

In the conventional percolator, as above mentioned, the conductor wires are attached directly to the percolator, while with my improved percolator the conductor wires are attached to the detachable base, so that when the percolator is moved or lifted as when serving coffee, or for any other purpose, the percolator is simply lifted up as if it was setting free upon the table, leaving the base and conductor wires undisturbed.

It is obvious that in the event that the base or heating element becomes inoperative for lack of current, or otherwise, the main body of the percolator could be used in the same manner as the conventional non-electric percolator either on a coal or wood stove, or upon a gas jet, without danger of destruction or injury. It is equally evident that if the heating element was built integral with the body portion of the percolator, its use as a conventional non-electric percolator would destroy the heating element.

It is, therefore, evident that I have produced not only a more efficient percolator, but one of greater utility and ease of operation.

Having fully described my invention and its method of construction, what I claim as new and useful and desire to secure by Letters Patent is:—

1. An electric percolator of the class described, comprising a hollow cylindrical body closed at its lower end by a bottom having its periphery disposed in a horizontal plane and its center protruding upwardly and inwardly substantially in the form of the frustum of a hollow cone adapted to fit a base having a top of like contour, an electrically heated base the periphery of whose top lies in a horizontal plane and whose central portion extends upwardly in the form of the frustrum of a cone adapted to snugly fit into the bottom of said hollow cylindrical body, electric heating elements disposed within the top of said base and of like contour, said heating elements consisting of two independent elements adapted to be heated simultaneously and separately, and means for connecting said elements to a source of electric current, a second heating element in said base disposed about the periphery of the top thereof and in non-electrical contact with the first named heating element.

2. An electric percolator of the class described, comprising in combination, a body portion adapted to hold liquids, having its bottom protruding inwardly and upwardly, a detachable base electrically heated by a plurality of heating elements, having the central portion of its top extending upwardly adapted to fit into the upwardly protruding bottom of said body portion, thereby increasing the surface area of said bottom and of said electrically heated base.

3. An electric percolator of the class described, comprising a main body portion having the center of its bottom protruding inwardly and upwardly adapting said bottom to fit within the lower end of a tube of like contour vertically disposed within said body portion, an electrically heated detachable base comprising a plurality of heating elements in non-electric contact with each other, one of said elements extending upwardly from the center of said base adapted to fit into the cavity of the inwardly and upwardly protruding bottom of said main body portion, and the other electric heating element being disposed in a horizontal plane concentrically about the said electrically heated conical center of said base, and means for connecting and disconnecting said heating elements with sources of electric current.

In witness whereof I have hereunto affixed my signature this 25 day of May, 1926.

WILLIAM S. BREMER.